United States Patent
Ford et al.

(10) Patent No.: US 6,718,086 B1
(45) Date of Patent: Apr. 6, 2004

(54) ARTICLE COMPRISING A TUNABLE FILTER

(75) Inventors: Joseph E. Ford, Oakhurst, NJ (US); Keith W. Goossen, Aberdeen, NJ (US); James A. Walker, Howell, NJ (US)

(73) Assignees: Agere Systems, Inc., Allentown, PA (US); Triquint Technology Holding Co., Hillsboro, OR (US)

( * ) Notice: Subject to any disclaimer, the term of this patent is extended or adjusted under 35 U.S.C. 154(b) by 0 days.

(21) Appl. No.: 09/501,199

(22) Filed: Feb. 10, 2000

(51) Int. Cl.[7] .............................. G02B 6/26; G02B 6/28; G02B 6/42
(52) U.S. Cl. .............................. 385/27; 385/15; 385/24; 359/124
(58) Field of Search .............................. 385/15, 24, 124, 385/27; 359/124

(56) References Cited

U.S. PATENT DOCUMENTS

| 5,103,340 | A | * | 4/1992 | Dono et al. | 359/578 |
|---|---|---|---|---|---|
| 5,283,845 | A | * | 2/1994 | Ip | 385/24 |
| 5,739,945 | A | * | 4/1998 | Tayebati | 359/291 |
| 6,275,324 | B1 | * | 8/2001 | Sneh | 359/291 |
| 6,351,577 | B1 | * | 2/2002 | Aksyuk et al. | 385/15 |
| 6,426,830 | B1 | * | 7/2002 | Robinson | 359/308 |
| 6,438,149 | B1 | * | 8/2002 | Tayebati et al. | 372/45 |
| 2002/0061042 | A1 | * | 5/2002 | Wang et al. | 372/43 |

* cited by examiner

*Primary Examiner*—Akm Enayet Ullah
*Assistant Examiner*—Tina M Lin
(74) *Attorney, Agent, or Firm*—Christie, Parker & Hale, LLP

(57) ABSTRACT

An article comprising a tunable filter includes an optical cavity, a tuning device and a filter-disabling device. The tuning device is operable to change the center transmission wavelength of the tunable filter. The filter-disabling device is operable to temporarily disrupt the finesse or otherwise affect the transmissibility of the optical cavity, thereby preventing the transmission of any intervening wavelengths during tuning.

24 Claims, 9 Drawing Sheets

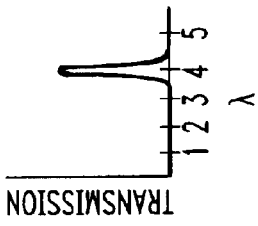
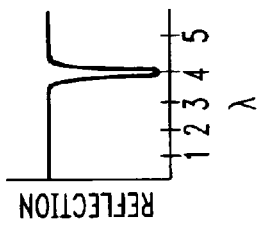
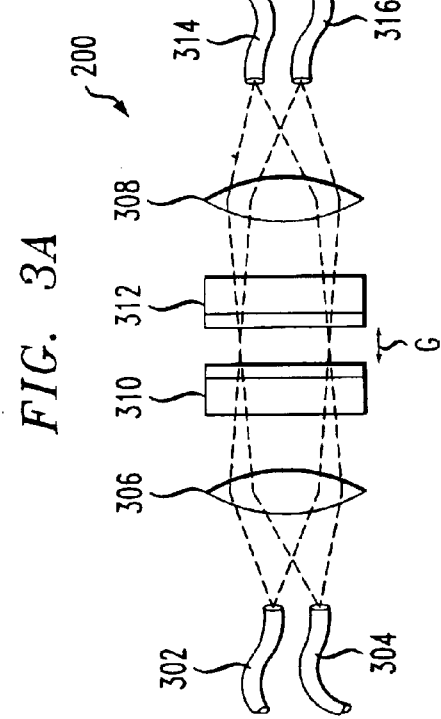
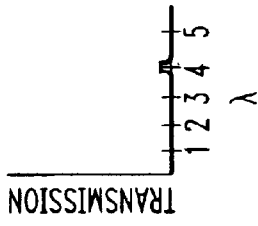
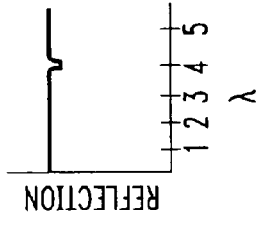
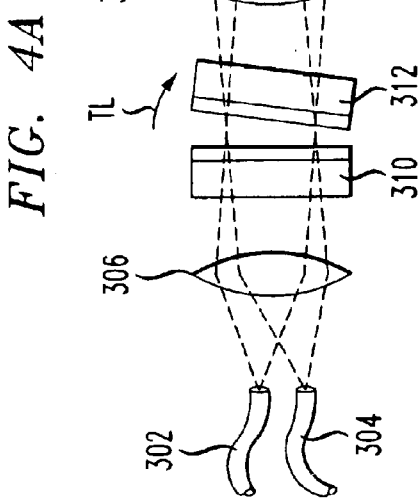

ARTICLE COMPRISING A TUNABLE FILTER

FIELD OF THE INVENTION

The present invention relates to optical communications. More particularly, the present invention relates to a tunable filter for use in conjunction with optical communications systems.

BACKGROUND OF THE INVENTION

FIG. 1a depicts a simplified schematic diagram of atypical WDM network 100 in the prior art. WDM network 100 includes a plurality of transmitters TX-1 through TX-n. Each of the transmitters includes an optical source for generating an optical signal $\lambda$-i, i=1, n. Each optical signal $\lambda$-i is characterized by a unique peak wavelength onto which information may be modulated in well-known fashion. The plurality of optical signals $\lambda$-1 through $\lambda$-n are combined into a single "multiplexed" signal m-$\lambda$ by wavelength multiplexer 102, and the multiplexed signal m-$\lambda$ is then launched into optical fiber 104.

A plurality of subscriber terminals (e.g., 106-S1, 106-S2 and 108-S1 through 108-Sn) are in optical communication with network 100. Each such subscriber terminal includes a receiver(s) (not shown) for receiving information that is carried over network 100 via multiplexed signal m-$\lambda$. An individual subscriber terminal may subscribe to the information contained on only a single channel (i.e., on a single optical signal $\lambda$-i) of multiplexed signal m-$\lambda$.

Subscriber terminals 108-S1 through 108-Sn located at end terminal 108 require, collectively, most or all of the individual channels $\lambda$-1 through $\lambda$-n multiplexed signal m-$\lambda$. To provide such channels to subscriber terminals 108-S1 through 108-Sn, multiplexed signal m-$\lambda$ is typically demultiplexed, fully resolving it into its constituent channels. Demultiplexer 110 is used for that purpose.

Subscriber terminals 106-S1 and 106-S2 are located at "small" intermediate node 106. Node 106 requires only a few of the channels of multiplexed signal m-$\lambda$ (ie., terminal 106-S1 receives only channel $\lambda$-1 and terminal 106-S2 receives only channel $\lambda$-3). As a consequence, rather than fully demultiplexing multiplexed signal m-$\lambda$ at node 106, only the required channels are dropped (i.e., removed or separated) from multiplexed signal m-$\lambda$ and delivered to the appropriate subscriber terminal. One or more "wavelength "(add)/drop" filters (i.e., filters 106-WAD1, 106-WAD2), which are operable to drop a single channel, are advantageously used for this purpose.

For example, in network 100 at node 106, add-drop filter 106-WAD1 separates and drops channel $\lambda$-1 from multiplexed signal m-$\lambda$. Channel $\lambda$-1 is then transmitted to subscriber terminal 106-S1. Also, add-drop filter 106-WAD2 separates and drops channel $\lambda$-3, which is then transmitted to subscriber terminal 106-S2. As the name implies, in at least some embodiments, wavelength add-drop filters are operable to add a single channel having the same characteristic wavelength as the drop channel. For example, in network 100, transmitter 106-T1 generates signal $\lambda$-1 that is added to multiplexed signal m-$\lambda$ via 106-WAD1. Alternatively, such a channel may be added to the multiplexed signal elsewhere in network 100.

It will be clear to those skilled in the art that a typical WDM optical communications network will have many more nodes and typically includes many other elements (e.g., amplifiers for maintaining signal strength, etc.) than are depicted in FIG. 1a. These other nodes and other elements are not shown so that attention can be focused on those elements that are germane to an understanding of the present invention.

FIG. 1b depicts a known wavelength add-drop filter. The particular filter depicted in FIG. 1b is a Fabry-Perot etalon filter, well known in the art. Etalon filter 150 consists of a pair of highly reflective dielectric mirrors M1 and M2 that are separated by a precisely defined gap G. An optical cavity OC is defined between opposed surfaces SM1 and SM2 of the final dielectric layer of each mirror.

A multiple-wavelength signal MWS-IN from input waveguide (e.g., an optical fiber) F-IN is collimated by lens L1 and illuminates the mirrors M1 and M2. Most of wavelengths of signal MWS-IN are reflected from the filter and couple into output waveguide F-OUT. Signals $D\lambda_i-D\lambda_j$ having a wavelength within a very narrow range or "passband" are, however, transmitted through the mirrors, pass through lens L2, and couple into drop waveguide F-D. Any signals A$\lambda$ having a wavelength within the narrow pass band of the filter can be delivered to filter 150 from "add" waveguide F-A and coupled into output waveguide F-OUT.

Performance parameters of the etalon filter 150, such as reflectivity/transmissibility, passband, center transmission wavelength of the passband and finesse are readily calculable and are dependent on properties of the optical cavity OC (i.e., gap G) and mirror reflectivity and the coupling efficiency into output waveguides.

Returning to illustrative network 100, to "drop" two channels (e.g., $\lambda$-1 and $\lambda$-3) from multiplexed signal m-$\lambda$, two add-drop switches (e.g., implemented as described above) can be used. Alternatively, it is possible to drop the same two channels using a single "tunable" etalon filter having an adjustable passband "center" wavelength. The "center" wavelength is the predominant wavelength of the passband (hereinafter "center transmission wavelength").

In such tunable etalon filters, one of the two mirrors is typically placed on a translation actuator (e.g., a piezoelectric transducer) that is under electrical control. Moving the actuator changes the size of the gap between the mirrors. Since the gap (size) controls the center transmission wavelength of the filter, moving the actuator changes that center transmission wavelength.

A problem exists, however, with existing tunable filters. As explained above, to change the center transmission wavelength, the size of the gap between the two mirrors is altered. In doing so, the gap will assume a number of intermediate sizes until the desired size is attained. At such intermediate gap sizes, the optical cavity will tune to channels or signals having intervening wavelengths (hereinafter "intervening channels" or "intervening signals"). Such intervening signals will be transmitted by the filter, delivered to the drop fiber and passed to the subscriber terminal rather than to the intended destination. To prevent intervening signals from being delivered to a subscriber terminal in this manner, those signals must be disadvantageously temporarily interrupted while tuning the filter to a new center transmission wavelength.

The art would therefore benefit from a tunable filter that, during tuning, does not disrupt intervening channels.

SUMMARY OF THE INVENTION

Some embodiments of the present invention provide a tunable filter without some of the disadvantages of the prior art. In particular, the illustrative embodiment of the present invention is a tunable filter that does not interrupt intervening channels during tuning.

In accordance with the illustrative embodiment of the present invention, a tunable filter includes an optical cavity, a tuning device and a filter-disabling device. The length of the optical cavity defines the center transmission wavelength of the filter. Other attributes of the optical cavity and the mirrors define the finesse of the filter.

As used herein, the term "passband" refers to the range of wavelengths that are transmitted or passed by a filter, the term "center transmission wavelength" refers to the predominant or peak wavelength in the passband, and the term "finesse" refers to the transmissibility of the filter. The term "finesse" is also properly considered to be a measure of the "sharpness" of the transmission peak of the filter. And, as will be appreciated by those skilled in the art, the term "finesse" also has mathematical definitions (e.g., assuming equal reflectivity mirrors: finesse=$4r/(1-r^2)$, where "r" is the reflectivity of the mirrors). In the context of the present invention, the term "finesse" is intended to refer to the transmissibility of the filter, as will become clear later in this Specification.

The tuning device is operable to change the center transmission wavelength of the tunable filter. The filter-disabling device is operable to temporarily disrupt the finesse or otherwise substantially lower the transmissibility of the optical cavity, thereby preventing the transmission of any wavelengths through the tunable filter. In some embodiments, filter transmissibility is lowered by disrupting the reflectivity (along the optical axis) of at least one of the two mirrors defining an optical cavity.

In accordance with the present teachings, before changing the center transmission wavelength, the filter-disabling device is enabled. Doing so disrupts the finesse of the optical cavity thereby substantially preventing the transmission of any optical signals through the filter. The tuning device is then used to change the center transmission wavelength. Even though the tuning device will tune to undesired intervening channels during the tuning process, the filter will not transmit such intervening channels since the finesse of the optical cavity is disrupted (i.e., the transmissibility of the filter is low). After tuning is complete, the filter-disabling device is defeated and the filter exhibits its desired transmission characteristic (i.e., transmits the desired channel through the filter).

The inventive concept may be implemented in a variety of ways. Several illustrative embodiments are summarized below and described in more detail later in this Specification.

In some embodiments, the optical cavity comprises two spaced-apart mirrors. In a few of those embodiments, one of the mirrors is movable and functions as the tuning device. In particular, moving the movable mirror changes the length of the optical cavity thereby changing the center transmission wavelength of the filter. The movable mirror can be readily implemented using well-known surface micromachining techniques (e.g., micro-electromechanical systems "MEMS").

In one embodiment, filter-disabling device comprises an arrangement for tilting or rotating one of the mirrors. Tilting a mirror disrupts the finesse of the optical cavity such that the filter becomes reflective of all wavelengths of light.

In other embodiments, the optical cavity is modified wherein one of the two mirrors is "split" into two groups of layers of dielectric material that are separated by a gap. Thus, the filter has two "gaps," a primary gap between the first and the second mirror (tuning device), and an auxiliary gap (filter-disabling device) that divides the layers of the "split" mirror. Both the primary gap and the auxiliary gap are variable. When the auxiliary gap is at a (readily) predetermined size, the finesse of the filter is at a maximum. By appropriately changing the auxiliary gap, the finesse of the filter is disrupted and the filtering function is defeated.

In other embodiments, the filter-disabling device comprises an electrically-switched absorbing, scattering or depolarizing media that is disposed in the optical cavity. By applying a voltage, the optical characteristic of the media can be changed from non-transmissible to transmissible (or visa-versa). The cavity is tuned (i.e., the center transmission wavelength is changed) by changing the length of the optical cavity.

In still other embodiments, an optical cavity incorporates a semiconductor optical amplifier that provides either a zero-loss or highly lossy roundtrip as a function of whether current is flowing through the optical amplifier.

BRIEF DESCRIPTION OF THE DRAWINGS

FIGS. 3a–6a depict the operation of a first illustrative embodiment of a tunable filter in accordance with the present teachings.

FIGS. 3b–6b depict plots showing reflectivity versus wavelength at the various stages operation depicted in FIGS. 3a–6a, respectively.

FIGS. 3c–6c depict plots showing transmissibility versus wavelength at the various stages of operation depicted in FIGS. 3a–6a, respectively.

DETAILED DESCRIPTION

Figure 2A:
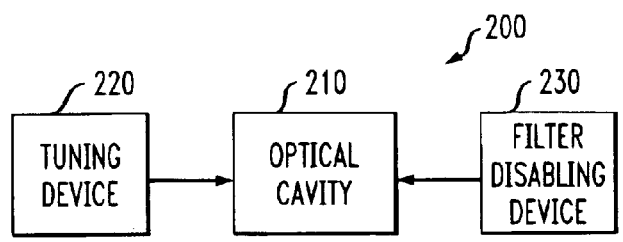
FIG. 2a depicts a block diagram of a tunable filter in accordance with the present teachings.

FIG. 2a depicts a block diagram of a tunable filter 200 in accordance with the present invention. Tunable filter 200 comprises optical cavity 210, tuning device 220 and filter-disabling device 230.

The length of the optical (resonant) cavity 210 determines the center transmission wavelength of tunable filter 200. Tuning device 220 is operable to change the center transmission wavelength of tunable filter 200. To do so, tuning device 220 varies a parameter (e.g., cavity length, etc.) that is determinative of the center transmission wavelength.

Filter-disabling device 230 is operable to temporarily disable the transmission behavior of the filter by disrupting the finesse or transmission characteristic of optical cavity 210. Though depicted as separate elements in FIG. 2a, in some embodiments, tuning device 220 and filter-disabling device 230 are realized by a single element.

Figure 2B:
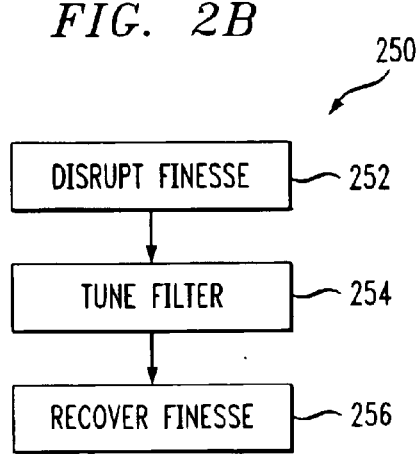
FIG. 2b depicts a method in accordance with the illustrated embodiment of the present invention.

Tunable filter 200 is advantageously operated in accordance with illustrative method 250 depicted in FIG. 2b. By doing so, tunable filter 200 operates in a "hitless" manner, wherein it does not transmit or "hit" any undesired intervening channels during tuning, even though such channels are not otherwise interrupted.

In accordance with operation 252 of method 250, the finesse of optical cavity 210 is disrupted so that optical signals are not transmitted by filter 200, regardless of their wavelength. This is done by enabling filter-disabling device 230. In operation 254, tunable filter 200 is tuned using tuning device 220. After tunable filter 200 is tuned to the desired center transmission wavelength, finesse is recovered by disabling filter-disabling device 230, in accordance with operation 256.

In use as a drop filter or an add/drop filter, waveguides (not shown in FIG. 2a) are of course placed in optical communication with tunable filter 200 to effect that function. Several specific embodiments of a tunable add-drop filter in accordance with foregoing description are now described.

Figure 1A:
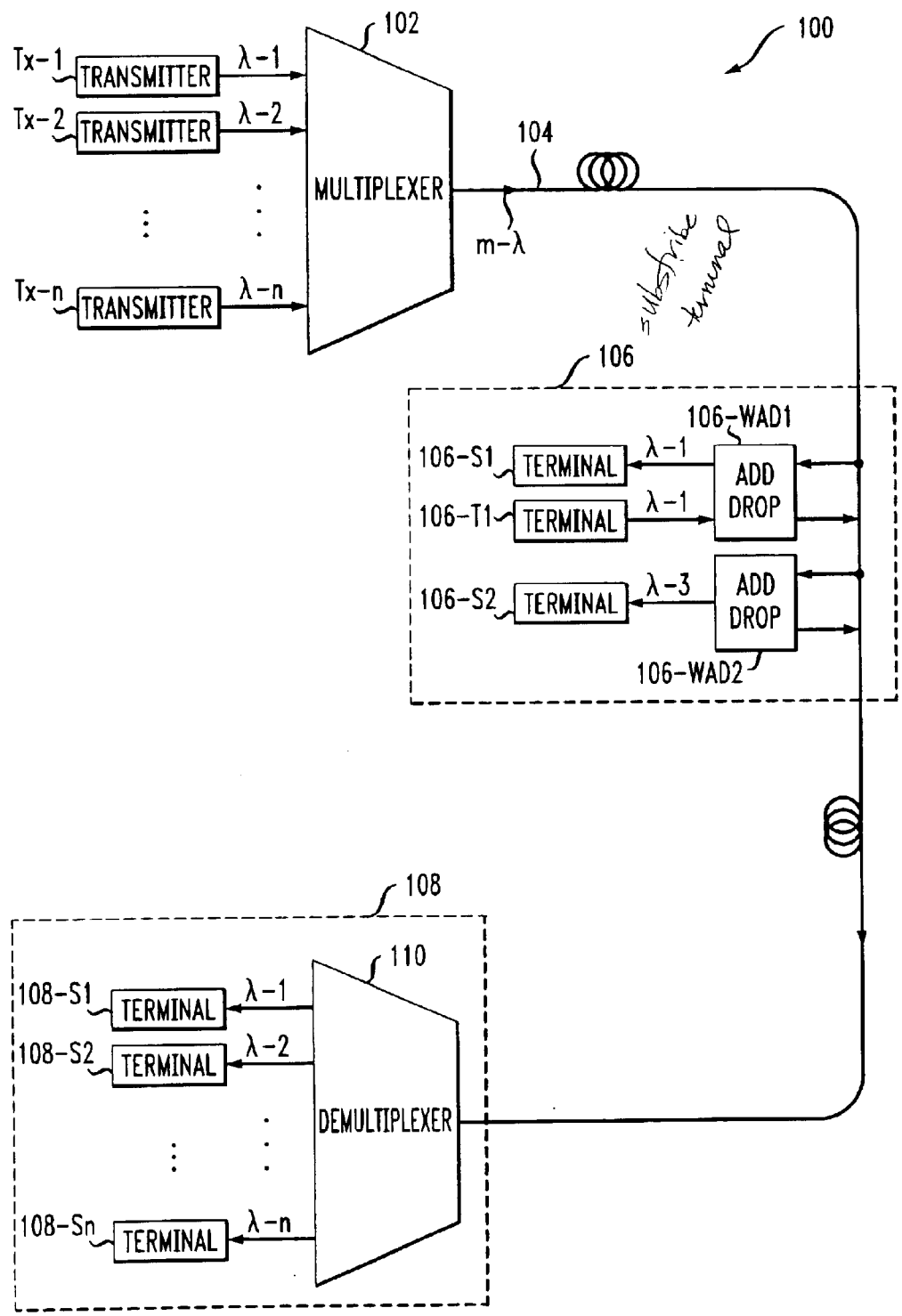
FIG. 1a depicts a simplified schematic diagram of a typical WDM network 100 in the prior art.
Figure 1B:
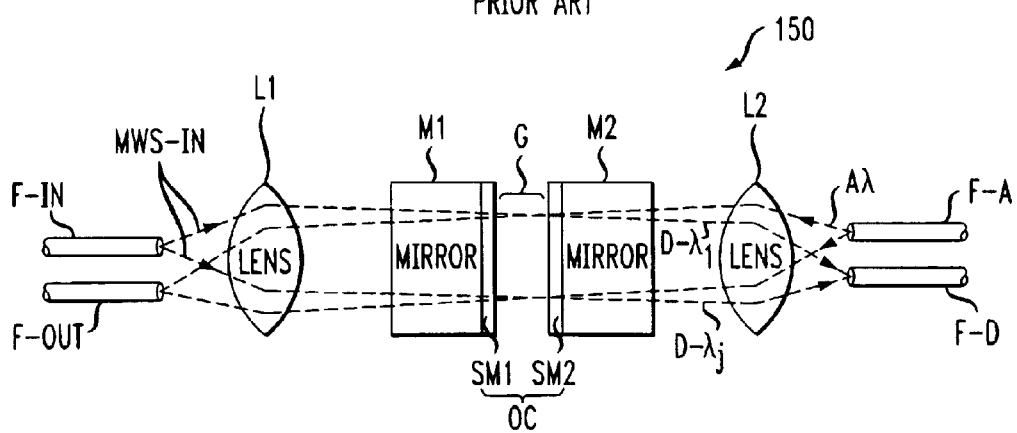
FIG. 1b depicts a typical wavelength add-drop filter, which is implemented using a Fabry-Perot etalon.

FIGS. 3a, 4a, 5a and 6a depict an illustrative embodiment of tunable filter 200 and the operation thereof in accordance with illustrative method 250. In the embodiment depicted in FIGS. 3a, 4a, 5a and 6a, tunable filter 200 is configured in the manner of the tunable Fabry-Perot etalon add-drop switch of FIG. 1b. Unlike the switch of FIG. 1b however, tunable filter 200 advantageously includes a filter-disabling device.

In more detail, tunable filter 200 of FIGS. 3a, 4a, 5a and 6a, in its implementation as an add-drop filter, has two spaced-apart mirrors 310 and 312, two lenses 306 and 308, input waveguide 302, output waveguide 304, add waveguide 314 and drop waveguide 316, arranged as shown.

Spaced-apart mirrors 310 and 312 define an optical cavity. Mirror 310 is "fixed" (ie., non-movable) while mirror 312 is movable. In the depicted embodiment, mirror 312 is advantageously capable of "tilting" or being rotated relative to fixed mirror 310, in addition to being "translatable" (ie., non-rotational movement) to vary the spacing between the mirrors (ie., to vary the cavity length). As described further below, by virtue of such functionality, mirror 312 serves as both tuning device 220 and filter-disabling device 230.

Lens 306 is operative to receive an optical signal from input waveguide 302 and to collimate it. Lens 306 is also operative to receive a collimated optical signal reflected by/transmitted through mirror 310 and focus it into output waveguide 304. Similarly, lens 308 is operable to receive a collimated optical signal reflected by/transmitted through mirror 312 and focus it into drop waveguide 316, and to receive an optical signal from add waveguide 314 and to collimate it. Ray tracings depict the path of optical signals through tunable filter 200 as described above. Lenses 306 and 308 can be, without limitation, a graded index (GRIN) lens, a ball lens and a molded (e.g., injection molded) lens.

For pedagogical purposes, it is assumed for the following description that a multiplexed optical signal is delivered to tunable filter 200 by input waveguide 302. The multiplexed optical signal consists of five channels, each characterized by a different peak wavelength.

FIG. 3a depicts tunable filter 200 in a specific state, wherein mirrors 310 and 312 are parallel to one another and are separated by gap $G_1$ (i.e., $G_1$ is the length of optical cavity). In the state illustrated in FIG. 3a, tunable filter 200 is assumed to reflect channels 1–3 and 5 and to transmit channel 4, as illustrated by the plots of FIGS. 3b and 3c.

Given the foregoing assumptions, in the state depicted in FIG. 3a, channel 4 is transmitted through mirror 312 to lens 308, which focuses channel 4 into drop waveguide 316. The multiplexed signal, without channel 4, is reflected by the optical cavity to lens 306, which focuses the signal into output waveguide 304. A signal having the same peak wavelength as channel 4 can be added to reflected channels 1–3 and 5 via add waveguide 314.

As will be appreciated by those skilled in the art, in some embodiments, an "add" waveguide (e.g., add waveguide 314) is not present, so that the filter is simply a "drop" filter. The "add" functionality can be provided elsewhere in the optical communications network, or not at all, as appropriate. In still other embodiments, a "drop" waveguide is not present. Rather, the passed signal is transmitted directly to an optical device, such as a detector.

FIGS. 4a–6a depict, collectively, "hitless" tuning of tunable filter 200 in accordance with method 250. In particular, those Figures show how tunable filter 200 is tuned to a new center transmission wavelength (e.g., wherein channel 2 is transmitted and channels 1 and 3–5 are reflected) while none of the intervening channels are transmitted.

In accordance with operation 252 of method 250, before tuning filter 200 to a new center transmission wavelength, finesse is disrupted. To do so, the filter-disabling device is enabled. In the context of the present embodiment, the filter-disabling device is enabled by tilting mirror 312 so that mirrors 310 and 312 are no longer parallel to one another. FIG. 4b depicts the filter-disabling device enabled wherein mirror 312 is "tilted" or "rotated" along path TL.

FIGS. 4b and 4c illustrate the effect that tilting mirror 312 has on the finesse of the optical cavity. In particular, the cavity becomes substantially completely reflective to all wavelengths (e.g., channels 1–5).

In accordance with operation 254 of method 250, after disabling the filter, it is tuned to a desired center transmission wavelength. In the context of the present invention, filter 200 is tuned by translating mirror 312, thereby changing the gap between mirrors 310 and 312 (i.e., the length of the optical cavity). The tilt of mirror 312 is maintained during translation thereby ensuring that filter 200 does not transmit undesired intervening channels during the tuning operation. FIG. 5a depicts the gap between mirrors 310 and 312 being increased as mirror 312 is translated along path TR.

Figure 5C:
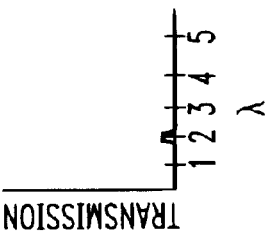
Figure 5B:
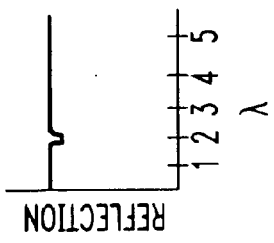
Figure 5A:
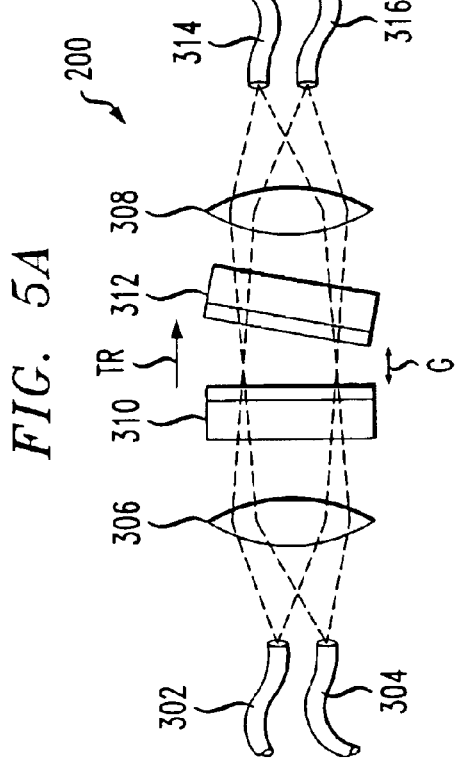

FIGS. 5b and 5c show that filter 200 remains disabled wherein channels 1–5 are substantially completely reflected.

Figure 6C:
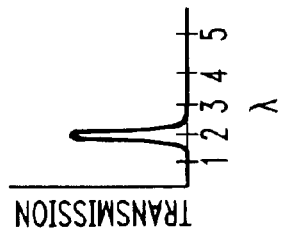
Figure 6B:
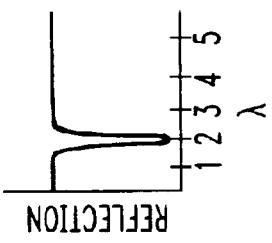
Figure 6A:
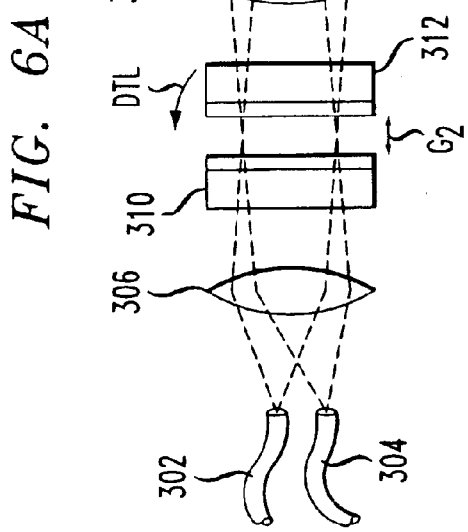

In accordance with operation 256 of method 250, after tuning to the desired center wavelength, finesse is recovered. To do so, the filter-disabling device is disabled. In the context of the present invention, the filter-disabling device is disabled by returning mirror 312 to its "original" non-tilted orientation so that mirrors 310 and 312 are once again parallel. FIG. 6a depicts mirror 312 rotated, along path DTL, to its non-tilted orientation, and further depicts mirrors 310 and 312 separated by gap $G_2$ (different in size from gap $G_1$). Since mirrors 310 and 312 are returned to a parallel disposition, the transmission characteristic of filter 200 is again exhibited. With mirrors 310 and 312 separated by gap $G_2$, filter 200 is tuned to a different center transmission wavelength than when the mirrors were separated by gap $G_1$. (Compare FIGS. 6b and 6c showing transmission of channel 2 and reflection of channels 1 and 3–5 with FIGS. 3b and 3c showing transmission of channel 4 and reflection of channels 1–3 and 5.)

It will be appreciated that the "translation" and "tilting" functionality of mirror 312 can be implemented using any one of a variety of different structural arrangements. One such arrangement is depicted in FIGS. 7, 8 and 9a–9c.

Figure 7:
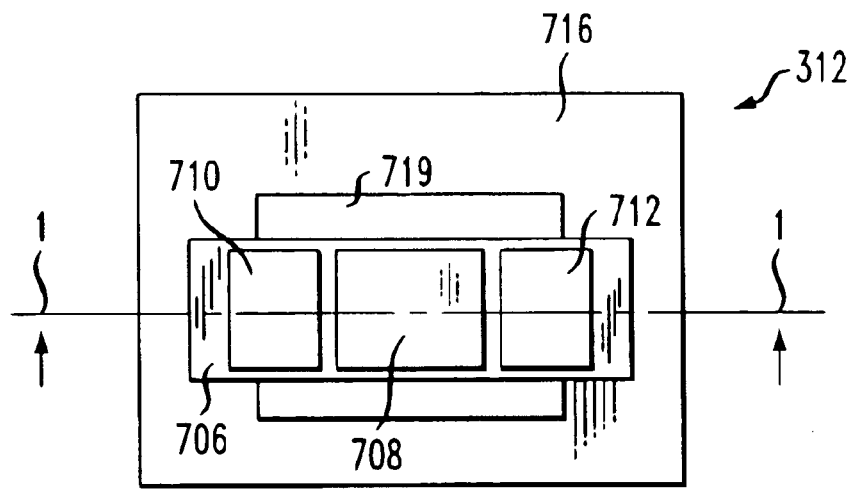
FIG. 7 depicts a plan view of a movable, tiltable mirror for use in the first illustrative embodiment of a tunable filter.
Figure 8:
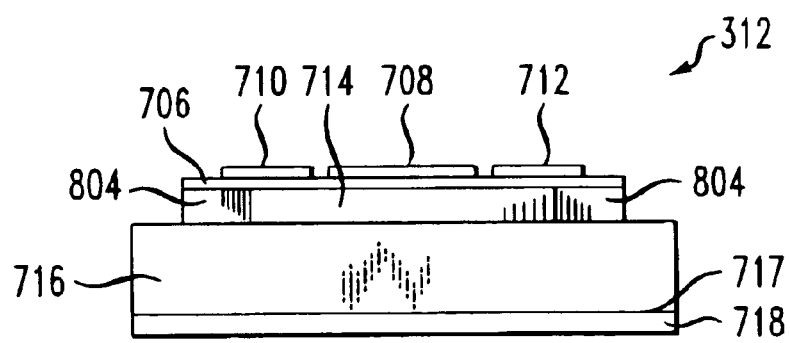
FIG. 8 depicts a side view of the movable, tiltable mirror of FIG. 7.
Figure 9A:
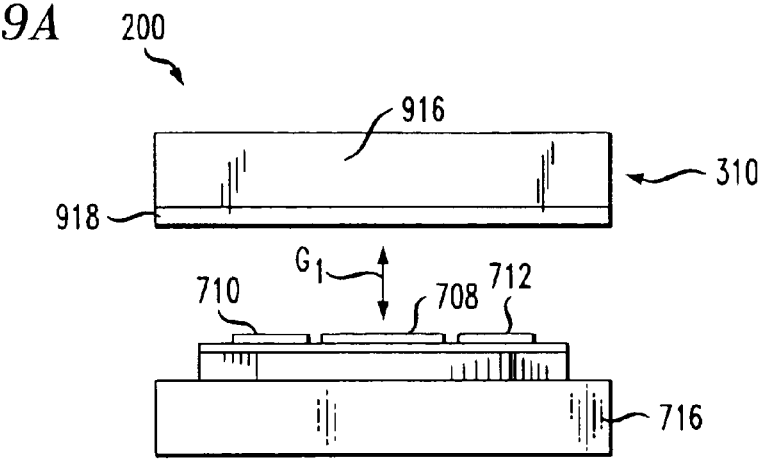
FIGS. 9a–9c depict the operation of the movable, tiltable mirror of FIGS. 7 and 8.
Figure 9B:
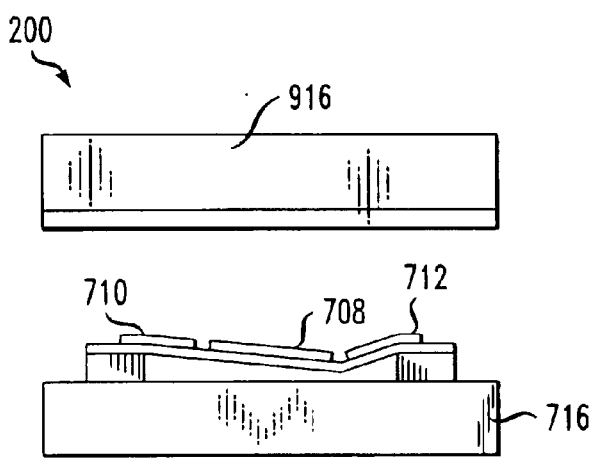
Figure 9C:
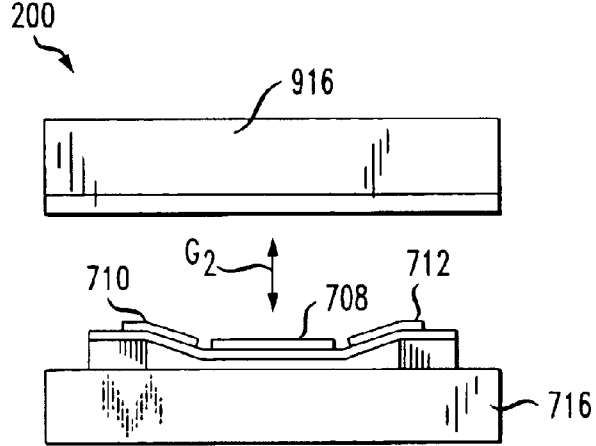

FIG. 7 (top view) and FIG. 8 (side view along line 1—1 of FIG. 7) depict an illustrative embodiment of translatable and tiltable mirror 312. Translatable/tiltable mirror 312 comprises mirror 708 disposed on layer 706. Though depicted as a single layer, mirror 708 is advantageously realized as a dielectric mirror, well known in the art, comprising multiple layers of material(s) wherein the refractive indices of adjacent layers are different. Supports 804 suspend layer 706 a above substrate 702, forming gap 714 therebetween. Two independently controllable electrodes 710 and 712 are disposed on layer 706 flanking mirror 708.

In operation, a voltage applied across one or both electrodes 710, 712 (and substrate 716) generates an electrostatic force that attracts the layer 706, and mirror 708, toward substrate 716. Applying voltage unequally to electrodes 710 and 712 imparts a controllable angle (i.e., tilt or rotation) to layer 706 and, hence, mirror 708. (See FIG. 9b.) In such a manner, movable mirror 312 functions as the filter-disabling device, disrupting the finesse of the optical cavity by destroying the parallel relationship of the two mirrors that define the optical cavity.

Once the tilted disposition of mirror 312 is established, translation of the mirror is effected, as required, by increasing the voltage (but maintaining an imbalance of applied voltage as between the two electrodes). In this manner, a "tilt" is maintained, but layer 706 is drawn closer to substrate 716. To recover the finesse of the optical cavity, the voltage of the appropriate electrode is increased until layer 706 is rotated back to a non-tilted orientation. (See FIG. 9c). For additional information pertaining to electrically-controlled "tilt" mirrors, see U.S. pat. app. Ser. No. 09/271,577, which is incorporated by reference herein.

In an embodiment depicted in FIG. 8, fixed mirror 718 is disposed on back surface 717 of substrate 716 to create the optical cavity. Alternatively, in the embodiment depicted in FIGS. 9a–9c, fixed mirror 918 is fabricated as part of a separate multi-layer structure that includes substrate 916. As desired or necessary, a window 719 is formed within the substrate (e.g., substrate 716 of FIG. 7). Window 719 is required, for example, if substrate 716 is not optically transparent at the operating wavelengths of filter 200.

Tunable filter 200 is fabricated in well-known fashion using standard micro-machining techniques and devices.

When in use as an add-drop filter in an optical communications system, the embodiments of tunable filter 200 described in this Specification incorporate various waveguides (e.g., optical fibers, etc.) and lenses for effecting communication with the communications system and subscriber terminals. (See, for example, FIGS. 3a–6a.) Such waveguides and lenses are not shown in conjunction with the various embodiments of tunable filter 200 so that attention is focused on elements that are germane to an understanding of the present invention. Those skilled in the art will know how use waveguides and lenses in conjunction with tunable filter 200.

Figure 10:
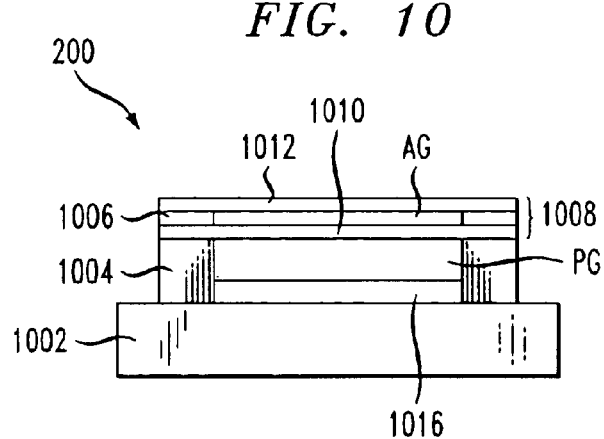
FIG. 10 depicts a side view of a second illustrative embodiment of a tunable filter in accordance with the present invention.
Figure 11:
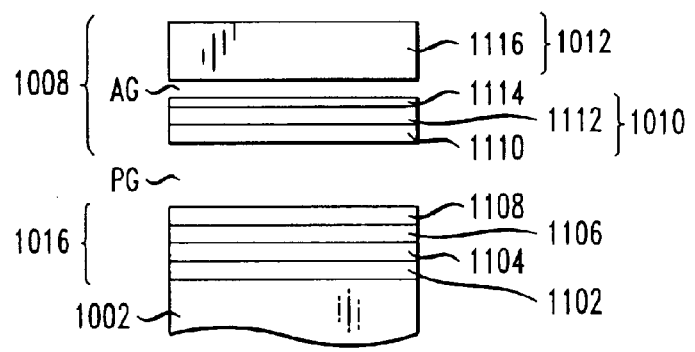
FIG. 11 depicts an arrangement of layers that comprise the dielectric mirrors of the tunable filter of FIG. 10.

FIGS. 10 and 11 depict yet another embodiment of a tunable filter 200 in accordance with the present teachings. More particularly, FIG. 10 depicts the overall structure of tunable filter 200 and FIG. 11 provides additional detail concerning the structure of the mirrors that define the optical cavity of the tunable filter.

Like the previously described embodiments of tunable filter 200, the embodiment depicted in FIG. 10 includes an optical cavity, tuning device and filter-disabling device. Such elements are, however, implemented in a different manner than for the translatable, tilting mirror filter previously described.

In the embodiment illustrated in FIG. 10, tunable filter 200 includes substrate 1002, fixed mirror 1016 and movable mirror 1008, arranged as shown. Movable mirror 1008 is suspended above fixed mirror 1016 by supports 1004 such that a primary gap PG is defined therebetween.

Movable mirror 1008 is bifurcated into two groups of layer(s) 1010 and 1012. Each group of layer(s) comprises at least one layer. Layer(s) 1012, hereinafter referred to as "the upper movable layer," is suspended over layer(s) 1010, hereinafter referred to as "the lower movable layer," by supports 1006 defining auxiliary gap AG therebetween.

Like movable mirror 312 previously-described, movable mirror 1008 functions as both the tuning device and the filter-disabling device. Such dual functionality is achieved, however, in a different manner by virtue of the differences in structure of those mirrors. In particular, as described further below, rather than tilting mirror 1008 to disrupt the finesse of the optical cavity, the size of auxiliary gap AG is changed, which achieves the same result. Note, however, that in both such cases, finesse is disrupted by altering the reflectivity, along the optical axis, of (at least) one of the two mirrors that define the optical cavity.

Regarding the structure of the mirrors, movable mirror 1008 is advantageously divided into layers of material that are an odd-multiple of an eighth of a wavelength (of the optical signal) thick (as measured in the layer). For example, in the embodiment depicted in FIG. 11, upper layer 1012 comprises a layer 1116 of material that has a thickness of five-eighths of a wavelength. Bottom layer 1010 comprises three layers of material including a layer 1110 that has a thickness of one-quarter of a wavelength, a layer 1112 that has a thickness of one-quarter of a wavelength and a layer 1114 that has a thickness of one-eighth of a wavelength.

By virtue of the overall thickness of movable mirror 1008 (5/4 wavelengths plus the gap), the finesse of illustrative tunable filter 200 of FIGS. 10 and 11 is at a maximum when auxiliary gap AG is equal to an integer number of one-half wavelengths. As auxiliary gap AG changes, the finesse is disrupted. In this manner, the filter-disabling device is implemented. Changing primary gap PG (ie., changing the optical cavity defined between opposed surfaces of layers 1110 and 1108) changes the center transmission wavelength of the filter and, as such, implements the tuning function. Since upper and lower movable layers 1012 and 1010 of movable mirror 1008 are independently movable, auxiliary gap AG can be changed independently of primary gap PG to some extent. Note, however, that changes in the auxiliary gap AG affect tuning and changes in the primary gap affect finesse.

Figure 15:
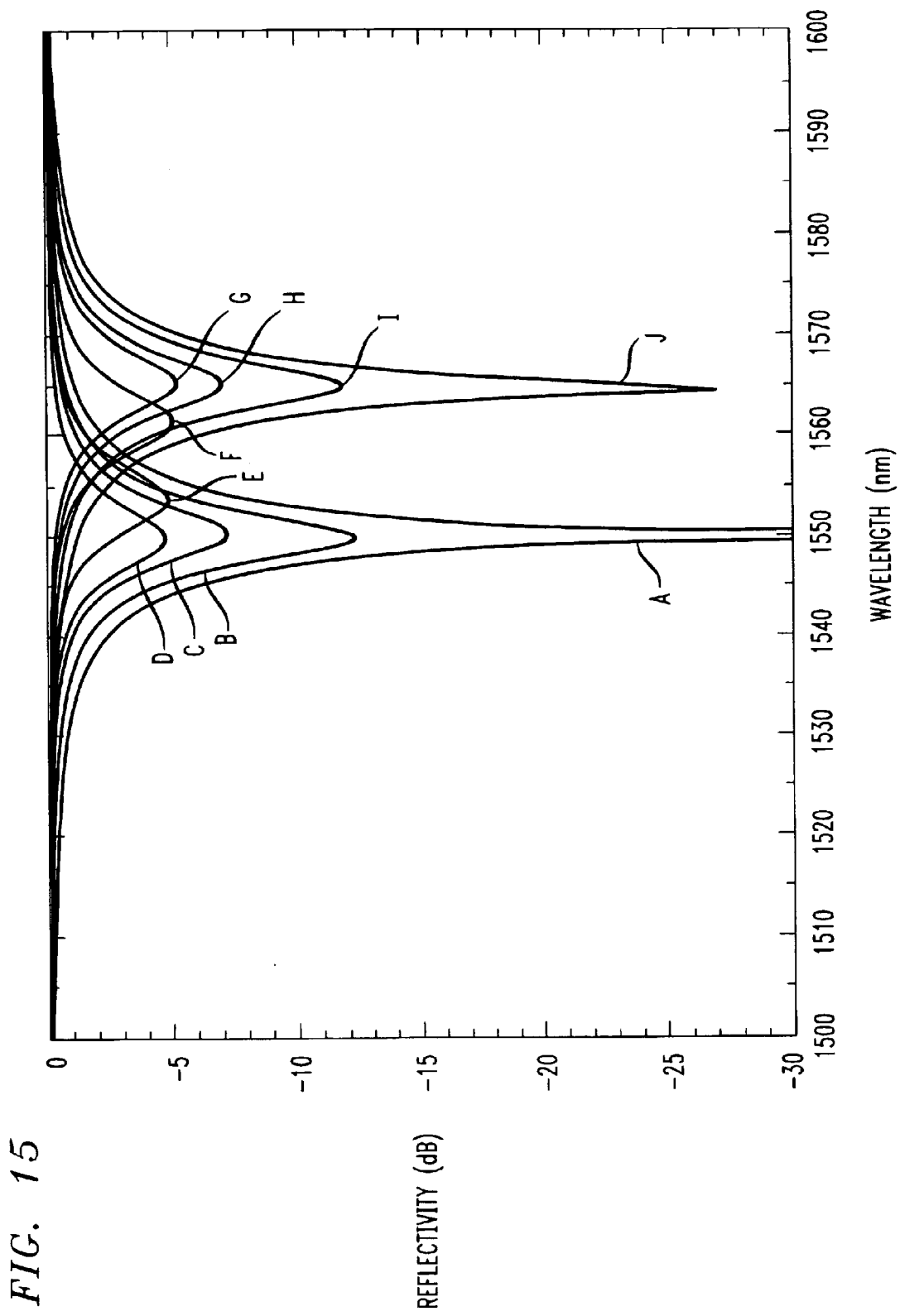
FIG. 15 depicts the operation of the tunable filter of FIGS. 10 and 11.

FIG. 15 depicts the operation (theoretical) of illustrative tunable filter 200 of FIGS. 10 and 11 based on values of the primary and the auxiliary gap for states A–J listed in TABLE 1 below.

TABLE 1

| State | Operating λ (nm) | Auxiliary Gap | | Primary Gap | |
|---|---|---|---|---|---|
| | | Angstroms | Fract λ | Angtroms | Fract λ |
| A | 1550 | 7750 | 0.500 | 15,500 | 1.000 |
| | 1565 | 7750 | 0.495 | 15,500 | 0.990 |
| B | 1550 | 7300 | 0.471 | 15,550 | 1.003 |
| | 1565 | 7300 | 0.467 | 15,550 | 0.994 |
| C | 1550 | 6700 | 0.432 | 15,600 | 1.007 |
| | 1565 | 6700 | 0.428 | 15,600 | 0.997 |
| D | 1550 | 5600 | 0.361 | 15,650 | 1.010 |
| | 1565 | 5600 | 0.358 | 15,650 | 1.000 |
| E | 1550 | 5600 | 0.361 | 15,700 | 1.013 |
| | 1565 | 5600 | 0.358 | 15,700 | 1.003 |
| F | 1550 | 5600 | 0.361 | 15,800 | 1.019 |
| | 1565 | 5600 | 0.358 | 15,800 | 1.010 |
| G | 1550 | 5600 | 0.361 | 15,850 | 1.023 |
| | 1565 | 5600 | 0.358 | 15,850 | 1.013 |
| H | 1550 | 6650 | 0.429 | 15,800 | 1.019 |
| | 1565 | 6650 | 0.425 | 15,800 | 1.010 |
| I | 1550 | 7300 | 0.471 | 15,750 | 1.016 |
| | 1565 | 7300 | 0.467 | 15,750 | 1.006 |
| J | 1550 | 7825 | 0.505 | 15,700 | 1.013 |
| | 1565 | 7825 | 0.500 | 15,700 | 1.003 |

Referring to FIG. 15 and TABLE 1 above, at state A, tunable filter 200 exhibits strong notch filter characteristics (i.e., high Q) at a passband having a center transmission wavelength of about 1550 nm. As auxiliary gap AG is changed from λ/2 as indicated at states B, C and D, the finesse of the optical cavity is disrupted. As shown in FIG. 15, the transmissibility of the filter falls off sharply with the movements indicated proceeding from state A to B to C to D.

With finesse suitably low at state D, the auxiliary gap AG is maintained at 5600 angstroms while primary gap PG is increased as indicated at states E, F and G. From state G, auxiliary gap AG is then sequentially increased to λ/2 at final state J. Primary gap PG is decreased from its value at state G to its final value at state J. At state J, tunable filter 200 exhibits high Q at a passband having a center transmission wavelength of about 1565 nm.

Thus, in proceeding from state A to state J, tunable filter 200 is tuned to a new center transmission wavelength in accordance with method 250, wherein:
- in a first operation 252 (implemented by the sequential decrease in auxiliary gap AG from λ/2), finesse is disrupted (by enabling the filter-disabling device);
- in a second operation 254 (implemented by the sequential increase in primary gap PG), the filter is tuned; and
- in a third operation 256 (implemented by the sequential increase in auxiliary gap AG back to λ/2), finesse is recovered (by disabling the filter-disabling device).

It will be understood by those skilled in the art that primary gap GP was increased to a maximum at state G, then decreased from state G to final state J to keep the finesse suitably low during the tuning operation. In other words, if auxiliary gap AG is increased to 7825 angstroms (λ/2 at the new center transmission wavelength) from state E (AG= 5600 angstroms, PG=15,700 angstroms), finesse begins recovering (ie., transmissibility increases) before the new center transmission wavelength at 1565 nm is established. It is within the capabilities of those skilled in the art to calculate finesse and center transmission wavelength as a function of auxiliary gap size, primary gap (optical cavity) size and mirror specifics to determine preferred tuning routes.

Figure 12:
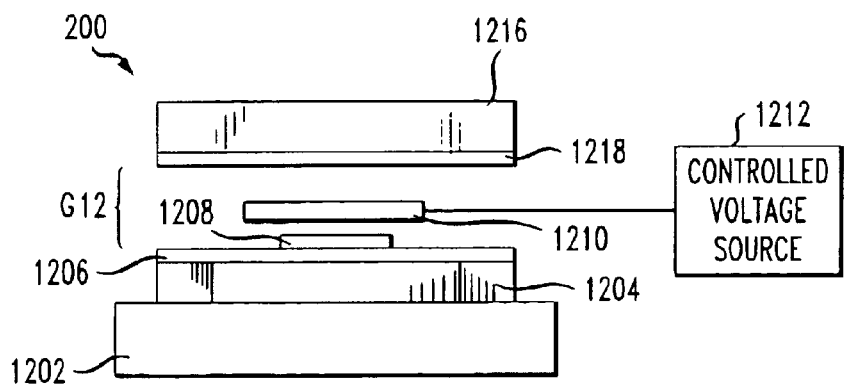
FIG. 12 depicts a side view of a third illustrative embodiment of a tunable filter in accordance with the present invention.

FIG. 12 depicts a further embodiment a tunable filter 200 in accordance with the illustrated embodiment of the present invention. Tunable filter 200 depicted in FIG. 12 is a Fabry-Perot etalon comprising two dielectric mirrors 1208 and 1218 that define an optical cavity having a size or gap G12. Mirror 1208 is configured as a movable mirror. In particular, dielectric layers 1208 are disposed on a layer 1206 that is supported, via supports 1204, over substrate 1202. As a voltage is applied across layer 1206 and substrate 1202 (which are suitably conductive or include electrodes, etc.), the resulting electrostatic force draws layer 1206 and mirror 1208 toward substrate 1202. In such a manner, the size of the optical cavity can be varied so that the filter can be tuned.

Tunable filter 200 of FIG. 12 also includes electrically-switched absorbing, scattering or depolarizing media 1210 that is disposed within the optical cavity. Media 1210 functions as the filter-disabling device. Under applied voltage, such as from controlled voltage source 1212, media 1210 changes from being transparent at the operating wavelengths to being opaque or reflecting (or visa-versa). Thus, assuming a multiplexed signal is entering filter 200 through mirror 1208, when media 1210 is transparent, the notch filter transmission characteristic is unaffected and signals that are within the passband are transmitted through the media and mirror 1218. When, however, media 1210 is opaque to optical signals, such signals can not be transmitted through the filter even if they are within the passband of the filter. Suitable electrically-switched absorbing media include, without limitation, a quantum well modulator. Suitable electrically-switched scattering and depolarizing media include, without limitation, liquid crystal material.

In the various embodiments described above, one of the mirrors that defines the optical cavity is suspended, or is disposed on a suspended layer, so that the mirror is movable on application of a voltage across the layer and a substrate. To apply a voltage, the layer or mirror and the substrate must include electrically-conductive electrodes (e.g., metallized regions) or comprise an electrically conductive material (polysilicon) or comprise a material that can be rendered suitably conductive via dopants (boron, etc.).

Moreover, a movable mirror must be robust as it is subjected to various mechanical stresses. To that end, the movable mirror advantageously incorporates a layer of silicon nitride. As is well known, the stress/mechanical strength of silicon nitride can be tailored during its deposition/growth. Thus, in one embodiment, movable mirror 1008 depicted in FIG. 10 is configured as follows: layers 1116, 1114 and 1110 comprise polysilicon, and layer 1112 comprises silicon nitride. The fixed (ie., non-moving) mirror also advantageously comprises layers of polysilicon and silicon nitride. If the optical signal must pass through the substrate, then the substrate must be optically transparent at the operating wavelengths of the filter. Silicon and gallium arsenide, for example, are suitably transparent at communications wavelengths.

Figure 13:
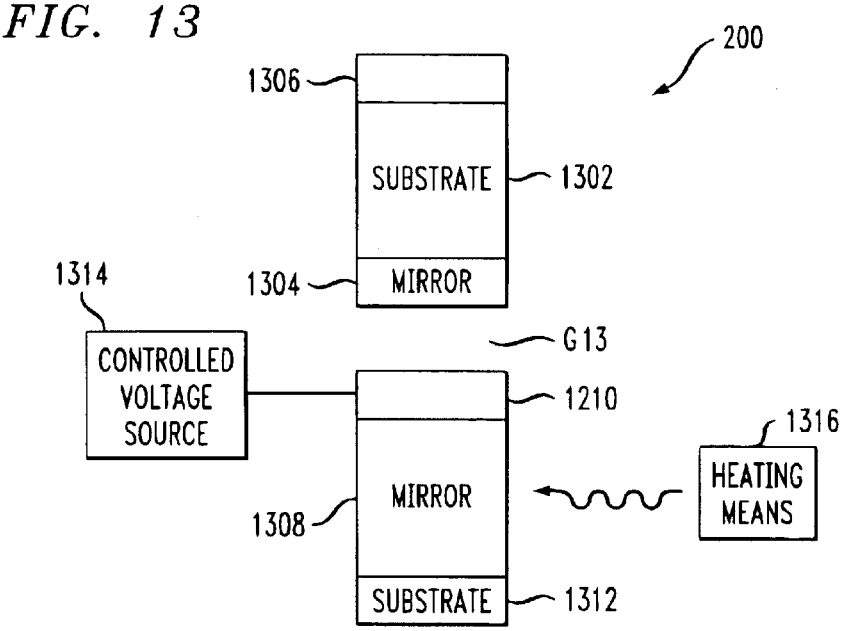
FIG. 13 depicts a fourth illustrative embodiment of a tunable filter in accordance with the present invention.

FIG. 13 depicts an additional embodiment of a tunable filter in accordance with the present teachings. Tunable filter 200 depicted in FIG. 13 includes two spaced-apart mirrors 1308 and 1304 that define an optical cavity. Mirror 1308 is disposed on substrate 1312 and mirror 1304 is disposed on substrate 1302. Antireflection coating 1306 is advantageously disposed on substrate 1302. Adjacent to mirror 1308 and within the optical cavity is electrically switched 1210. Controlled voltage source 1314 is electrically connected to media 1210. A gap G13 separates media 1210 from mirror 1304. The tunable filter also includes heater 1316.

In operation, illustrative filter 200 of FIG. 13 is tuned by activating heater 1316 so that substrate 1312 is heated and expands. The expansion of substrate 1312 decreases the size of the optical cavity (ie., mirror 1308 moves closer to mirror 1304) effecting the tuning function. Electrically switched media 1210 again functions as the filter-disabling device and is used in the manner previously described.

Figure 14:
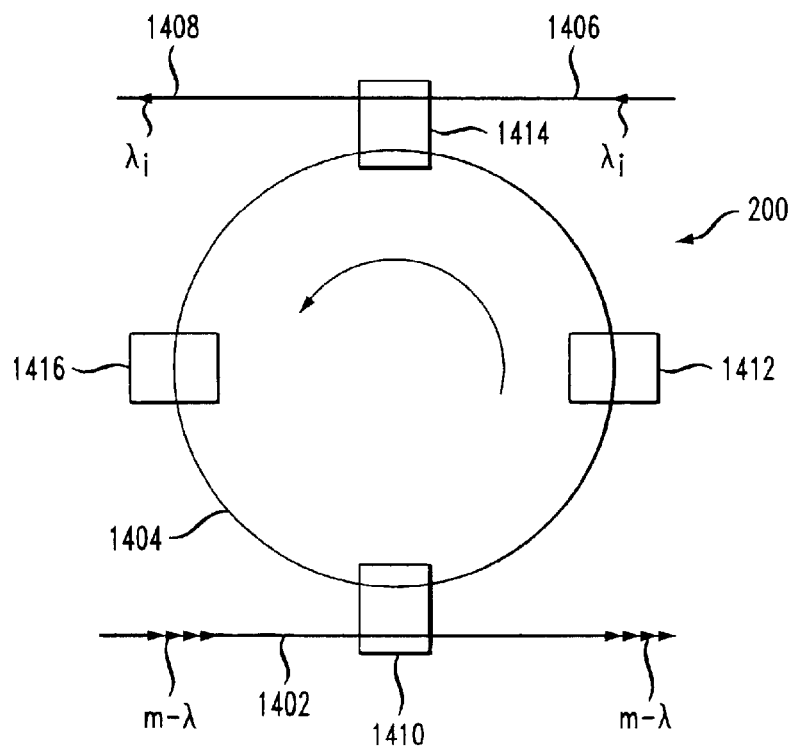
FIG. 14 depicts a fifth illustrative embodiment of a tunable filter in accordance with the present invention.

FIG. 14 depicts a final illustrative embodiment of a tunable filter 200 in accordance with the present teachings. As in the previous embodiments, the tunable filter of FIG. 14 includes an optical cavity, tuning device and a filter-disabling device. Such elements are, however, configured somewhat differently in the present embodiment as compared with previously-described embodiments.

Tunable filter 200 comprises ring resonator 1404, adjustable delay device 1412 and adjustable loss device 1416, arranged as shown. Multiplexed optical signal m-$\lambda$ is delivered over waveguide 1402 to ring resonator 1404 via one-percent coupler 1410. Dropped signal $\lambda_i$ is removed from the filter 200 via one-percent coupler 1414 over "drop" waveguide 1408. Similarly, a signal having wavelength $\lambda_i$ identical to the dropped signal can be added over "add" waveguide 1406 via one-percent coupler 1414.

In operation, coupler 1410 couples about one percent of multiplexed optical signal m-$\lambda$ to ring resonator 1404. The ring resonator, which is a waveguide configured in circular fashion as depicted in FIG. 14, defines an optical cavity. The resonance of ring resonator 1404 (ie., the passband of the filter) is a function of its length (i.e., the length of the optical cavity). An optical signal within the passband of the filter is coupled, via coupler 1414, to drop waveguide 1408.

As in previous embodiments, the filter is tuned by changing the size of the optical cavity. In the present embodiment, this is done using adjustable delay device 1412. In one embodiment, the adjustable delay device is implemented electro-optically wherein the index of refraction of a portion of the ring resonator is changed by altering a voltage applied thereto. Changing the index of refraction changes the effective cavity length and hence tunes the cavity. In another embodiment, the adjustable delay device is implemented thermo-optically, wherein a current heats ring resonator 1404, causing an increase in cavity length.

Filter 200 depicted in FIG. 14 is disabled while tuning using adjustable loss device 1416. The adjustable loss device can be implemented, for example, as a semiconductor optical amplifier. The semiconductor optical amplifier, which can be, for example, indium-gallium-arsenide, can be coupled in-line with ring resonator 1404. In the absence of current, the semiconductor optical amplifier is opaque. With an appropriate amount of applied current, the optical amplifier becomes transmissible. Adjustable loss device 1416 thus functions as the filter-disabling device.

It is to be understood that the above-described embodiments are merely illustrative of the invention and that many variations can be devised by those skilled in the art without departing from the scope of the invention. It is therefore intended that such variations be included within the scope of the following claims and their equivalents.

We claim:

1. An article comprising a tunable filter, the tunable filter comprising:
    an optical cavity having a length that is defined by first and second spaced mirrors and determinative of a center transmission wavelength of a passband of said tunable filter;
    a tuning device operative to change said length of said optical cavity; and
    a filter-disabling means operative to disrupt a finesse of said optical cavity, wherein
    said first mirror is movable and bifurcated into an upper layer and a lower layer spaced from one another to define an auxiliary gap therebetween.

2. The article of claim 1 further comprising:
    a first filter input for receiving a multiplexed optical signal having a plurality of spectral channels and delivering it to said optical cavity;
    a first filter output for receiving at least one of said spectral channels from said optical cavity, wherein said received spectral channel is within said passband of said tunable filter.

3. The article of claim 2, further comprising:
    a first waveguide in optical communication with said first filter input; and
    a second waveguide in optical communication with said first filter output.

4. The article of claim 3 further comprising:
    a plurality of transmitters for generating a plurality of optical signals;
    a multiplexer for multiplexing said optical signals into said multiplexed optical signal, said optical signals defining said spectral channels thereof;
    a node comprising said tunable filter and a subscriber terminal, wherein said subscriber terminal is in optical communication with said second waveguide and is operable to receive said spectral channel therefrom; and
    an optical fiber for transmitting said multiplexed optical signal to said node, wherein said first waveguide is in optical communication with said optical fiber via said node.

5. The article of claim 1, wherein said tuning device comprises said first mirror.

6. The article of claim 5 wherein said filter-disabling device comprises said first mirror.

7. The article of claim 6 wherein said first mirror is operative to tilt.

8. The article of claim 7 wherein said first mirror comprises:
    a layer suspended over a substrate;
    a dielectric mirror disposed on said layer; and
    two individually-addressable electrically-conductive electrodes.

9. The article of claim 6 wherein
    said upper layer and said lower layer are movable.

10. The article of claim 9 wherein:
    said upper layer and said lower layer each comprise at least one layer of material; and
    said one layer of material has a thickness that is an odd-multiple of an eighth of an operating wavelength of said tunable filter.

11. The article of claim 5 wherein said filter-disabling device comprises electrically-switched media selected from the group consisting of absorbing media, scattering media and depolarizing media.

12. The article of claim 11, wherein said electrically-switched absorbing media is a quantum well modulator.

13. The article of claim 1 wherein:
    said optical cavity comprises a ring resonator;
    said tuning device comprises an adjustable delay device operative to change a length of said optical cavity; and
    said filter-disabling device is an adjustable loss device characterized by a transmissibility that varies with applied current.

14. The article of claim 13 wherein:

said filter-disabling device comprises a semiconductor optical amplifier that is disposed in said ring resonator.

15. A method comprising:

disrupting finesse of a tunable filter having two spaced mirrors defining an optical cavity, one of said mirrors moveable and bifurcated so that a gap is defined within the bifurcated mirror;

tuning said tunable filter to a desired center transmission wavelength; and recovering said finesse of said tunable filter.

16. The method of claim 15 wherein said two spaced mirrors are in parallel relation to one another, and said step of tuning comprises changing a length of said optical cavity.

17. The method of claim 16 wherein said step of tuning further comprises moving at least one of said two mirrors to change said length of said optical cavity.

18. The method of claim 16 wherein the step of disrupting finesse comprises tilting one of said two mirrors so that said two mirrors are not in parallel relation to one another.

19. The method of claim 16 wherein:

when said filter is not being tuned, said gap has a first size that provides a first finesse suitable for transmitting said center transmission wavelength through said tunable filter;

the step of disrupting finesse comprises changing said first size of said gap to provide a second finesse that is unsuitable for transmitting said center transmission wavelength through said tunable filter.

20. The method of claim 16 wherein:

an electrically-switched media selected from the group consisting of absorbing media, scattering media and depolarizing media is disposed in said optical cavity;

when said filter is not being tuned, said electrically-switched media is transmissible at operating wavelengths of said filter;

said step of disrupting finesse comprises electrically switching said electrically-switched media so that it is non-transmissible at said operating wavelengths of said filter.

21. The method of claim 15 wherein:

said filter comprises a ring resonator having an in-line semiconductor optical amplifier;

when said filter is not being tuned, said semiconductor optical amplifier is transmissible at operating wavelengths of said filter;

said step of tuning comprises changing an effective length of said ring resonator; and said step of disrupting finesse comprises changing operation of said semiconductor optical amplifier so that it is non-transmissible at operating wavelengths of said filter.

22. An article comprising a tunable filter, said tunable filter comprising:

an optical cavity having a length that is defined by first and second spaced mirrors and determinative of a center transmission wavelength of a passband of said tunable filter, said first mirror bifurcated into a movable upper layer and a movable lower layer that are spaced from one another defining an auxiliary gap;

a tuning device operative to change said length of said optical cavity; and a filter-disabling means operative to disrupt a finesse of said optical cavity, wherein each of said tuning device and said filter-disabling device comprise said first mirror.

23. The article of claim 22 wherein:

said upper layer and said lower layer each comprise at least one layer of material; and said one layer of material has a thickness that is an odd-multiple of an eighth of an operating wavelength of said tunable filter.

24. A method comprising:

disrupting finesse of a tunable filter, said filter having two spaced mirrors in parallel relation to one another, said two mirrors defining an optical cavity, one of said mirrors bifurcated so that a gap is defined within the bifurcated mirror;

tuning said tunable filter to a desired center transmission wavelength by changing a length of said optical cavity;

recovering said finesse of said tunable filter, wherein, when said filter is not being tuned, said gap has a first size that provides a first finesse suitable for transmitting said center transmission wavelength through said tunable filter;

the step of disrupting finesse comprises changing said first size of said gap to provide a second finesse that is unsuitable for transmitting said center transmission wavelength through said tunable filter.

* * * * *